(12) United States Patent
Goeing et al.

(10) Patent No.: US 8,786,866 B2
(45) Date of Patent: Jul. 22, 2014

(54) APPARATUS AND METHOD FOR DETERMINING INNER PROFILES OF HOLLOW DEVICES

(75) Inventors: Frederik Goeing, Lower Saxony (DE); Marc Aldag, Lower Saxony (DE); Gunnar Michaelis, Niedersachsen (DE); Harald Grimmer, Niedersachsen (DE)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/411,333

(22) Filed: Mar. 2, 2012

(65) Prior Publication Data

US 2013/0229667 A1   Sep. 5, 2013

(51) Int. Cl.
   *G01B 11/30* (2006.01)
(52) U.S. Cl.
   USPC .......................................... 356/612; 356/601
(58) Field of Classification Search
   USPC ................... 356/612, 601, 607, 608, 369, 503
   See application file for complete search history.

(56) References Cited

U.S. PATENT DOCUMENTS

| | | | |
|---|---|---|---|
| 4,557,598 A | | 12/1985 | Ono et al. |
| 4,967,092 A | * | 10/1990 | Fraignier et al. ......... 250/559.07 |
| 7,602,487 B2 | | 10/2009 | Fukami et al. |
| 8,049,901 B2 | * | 11/2011 | Aoki et al. .................... 356/601 |
| 2006/0074509 A1 | | 4/2006 | Di Fabrizio et al. |
| 2013/0050701 A1 | * | 2/2013 | Jensen et al. .................. 356/369 |

OTHER PUBLICATIONS

International Search Report and Written Opinion dated Jun. 18, 2013 for International Application No. PCT/US2013/027912; all references in PCT cited above.

* cited by examiner

*Primary Examiner* — Tri T Ton
(74) *Attorney, Agent, or Firm* — Cantor Colburn LLP

(57) ABSTRACT

In one aspect, an apparatus for determining an internal profile of a measured device is provided, which method in one embodiment may include: a housing having a first axis, a measuring device configured to emit a light beam along a second axis offset from the first axis; a deflection device configured to direct the emitted light beam to an inner surface of the measured device; and a driver configured to rotate the measuring device about the first axis.

17 Claims, 6 Drawing Sheets

APPARATUS AND METHOD FOR DETERMINING INNER PROFILES OF HOLLOW DEVICES

BACKGROUND

1. Field of the Disclosure

This disclosure relates generally to apparatus for use in wellbore operations utilizing progressive cavity power devices.

2. Background of the Art

To obtain hydrocarbons (oil and gas), boreholes or wellbores are drilled by rotating a drill bit attached to a drill string end. A large number of the current drilling activity involves drilling deviated and horizontal boreholes for hydrocarbon production. Current drilling systems utilized for drilling such wellbores generally employ a drill string having a drill bit at its bottom that is rotated by a motor (commonly referred to as a "mud motor" or "drilling motor"). A typical mud motor includes a power section that includes a rotor having an outer lobed surface disposed inside a stator having a compatible inner lobed-surface. Such a power section forms progressive cavities between the rotor and stator lobed surfaces. Such motors are commonly referred to as progressive cavity motors or Moineau motors. Also, certain pumps used in the oil industry utilize progressive cavity power sections.

The stator typically includes a metal housing lined inside with a helically contoured or lobed elastomeric material. The volumetric efficiency of a mud motor, to a large extent, depends upon the seal created between the lobes of the rotor and the stator during rotation of the rotor inside the stator, which efficiency depends upon the fitting between the rotor and stator lobes. Rotor lobes being on the outside, their dimensions can be precisely measured using a variety of inspection tools. Stator lobe contours being on an inner surface of the stator are generally not precisely measured. Relatively small deviations of the stator contours from the desired or designed dimensions can result in a: (i) less efficient mud motor, for example due to excessive clearance between the rotor and stator lobes compared to the optimal clearance and; (ii) reduce operating life of the motor because of excessive contact (tighter tolerances) between the rotor and stator lobes. Available devices for nondestructive measurements of the Inner contour of a device are two-point-measuring devices that measure the Inner diameter of the stator, but not the complete cross-section of the inner contour of the stator.

The disclosure herein provides apparatus and methods for measuring inner contoured profiles of devices, such as stators of mud motors, progressive cavity pumps, and tubular members.

SUMMARY

In one aspect, an apparatus for determining inner profile of a hollow member is disclosed, that in one embodiment includes a housing having a first axis, a measuring device in the housing configured to emit a light beam along a second axis, wherein the first axis is offset relative to the second axis, a rotatable deflection device configured to direct the emitted light beam to an inner surface of the hollow member and a driver configured to rotate the measuring device about the first axis and a processor to determine the inner profile of the hollow member using light beam reflected from the inner profile of the hollow member.

In another aspect, a method for determining profile of a contoured inner surface of a device (measured device) having a central axis is disclosed, which method, in one embodiment includes: directing a light beam onto the inner surface of the device from a rotating deflection device from a selected location inside the measured device, wherein the selected location is offset from the central axis; receiving light beam reflected from the inner surface of the measured device; and determining the distance between the inner surface of the measured device and a reference location using the reflected light.

Examples of certain features of the apparatus and method disclosed herein are summarized rather broadly in order that the detailed description thereof that follows may be better understood. There are, of course, additional features of the apparatus and method disclosed hereinafter that will form the subject of the claims appended hereto.

BRIEF DESCRIPTION OF THE DRAWINGS

The disclosure herein is best understood with reference to the accompanying figures in which like numerals have generally been assigned to like elements and in which.

DESCRIPTION OF THE EMBODIMENTS

Figure 1B:
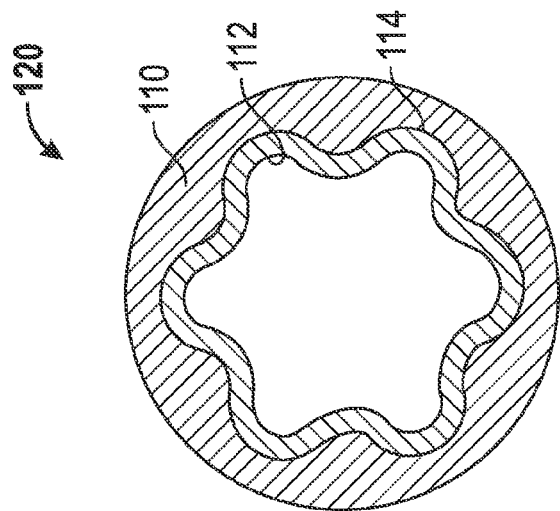
FIGS. 1A and 1B (Prior Art) show cross-sections of an exemplary stator having inner lobed surface that may be profiled using apparatus and methods described herein.
Figure 1A:
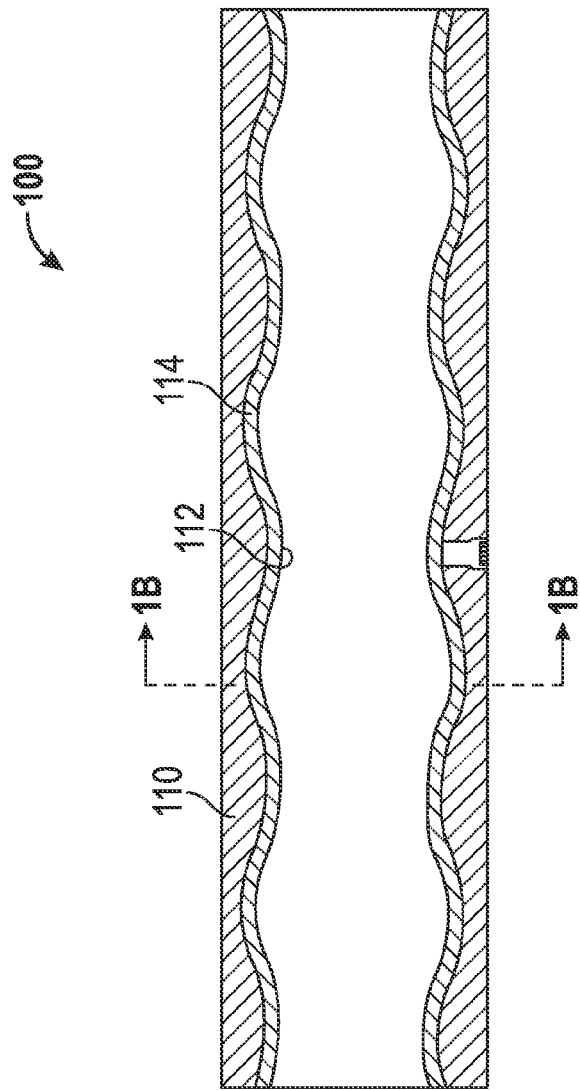

FIGS. 1A and 1B (Prior Art) show longitudinal and cross-sections of a typical stator 100 of a progressive cavity device, such as a mud motor or a pump. The stator 100 is shown to include a metallic housing 110 having an inner surface 112 with a number of lobes 114. The inner surface 112 may be a metallic surface or contain a layer of an elastomeric material. The cross-section of the stator 100 taken at A-A is shown as element 120 in FIG. 1B.

Figure 2:
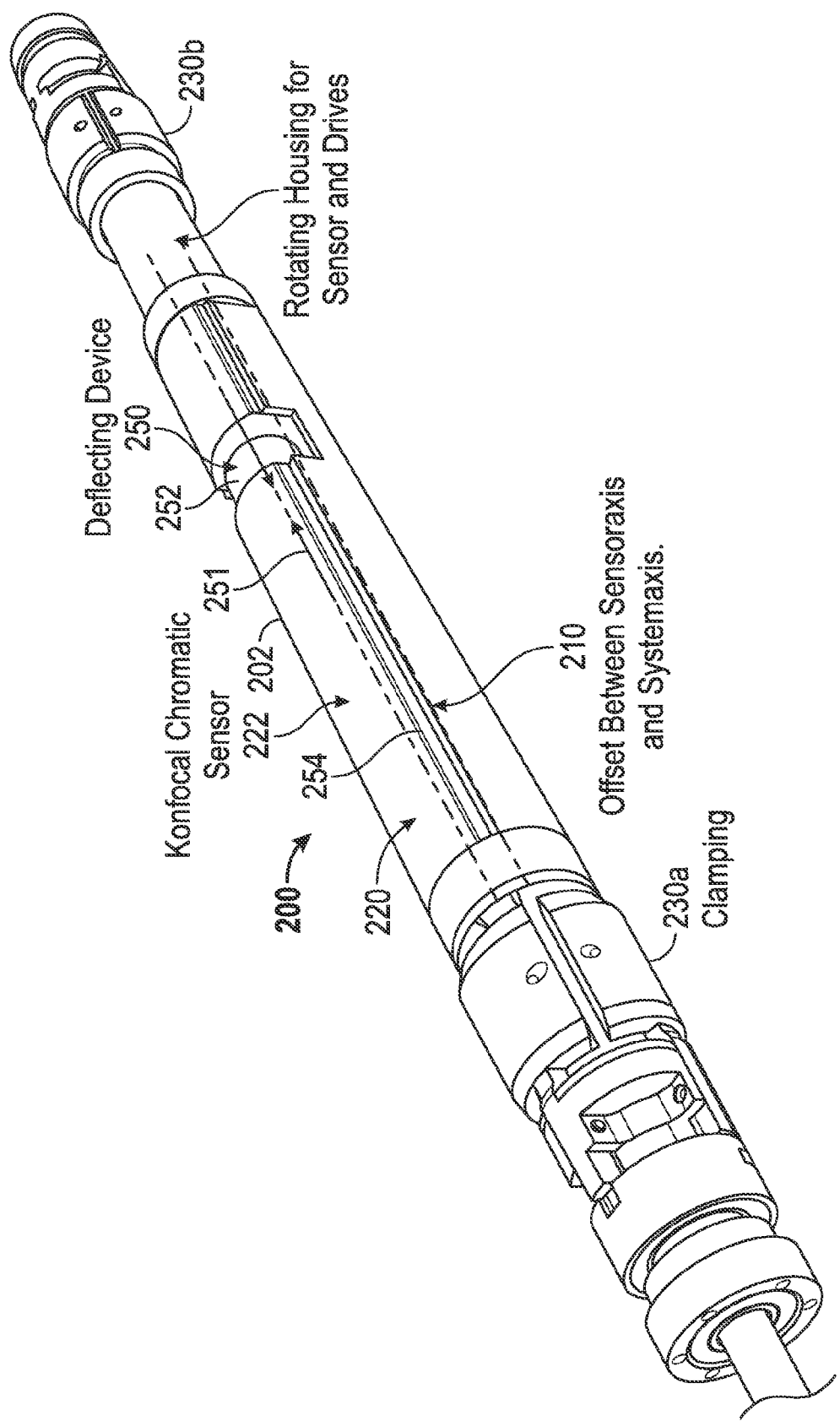
FIG. 2 is an isometric view of a device that may be used for determining profile or dimensions of an inner surface of a device, such as shown in FIGS. 1A and 1B.

FIG. 2 is an isometric view of an inspection device 200 configured to measure the dimensions of the inner contours of a hollow device (also referred to herein as the "measured device"), such as the stator of a mud motor or a progressive cavity pump, a pipe, etc. The device 200 includes a rotatable housing 202 along a center axis 210 of the device 200. The housing 202 encloses a sensor section 220 (also referred to as the measuring device") and a deflection device section 250. The sensor section 220 includes an optical sensor 222 that directs an emitted light along an axis 251 offset from the center axis 210 by a distance "a." Section 250 includes a deflection device 252 configured to rotate about a location on the axis 251. Thus, both the center of the deflection device and the emitted light beam are offset from the center axis 210 of the device 200 by a distance "a." The device 200 further includes a clamp 230*a* proximate to an end of the sensor section 220 and a clamp 230*b* proximate to an end of the deflection device section 250. When the device 200 is placed inside a contoured member or device, such as stator 100 shown in FIG. 1A, the clamps 230a and 230b may be activated to position the device 200 in the measured device to clamp on the inside of the stator 100 so that the center axis 210 of the device 200 is coaxial with the center axis of stator. In aspects, the deflection device 252 is rotated about a location on the emitted light beam axis 251 and the housing 202 may be rotated between the clamps 230a and 230b about the center axis 210. Thus, rotating the housing 202 rotates both the sensor section 220 and the deflection device section 250 about the center axis 210. The deflection device 252 and the sensor section may be rotated independent of each other at different rotational speeds.

Figure 3:
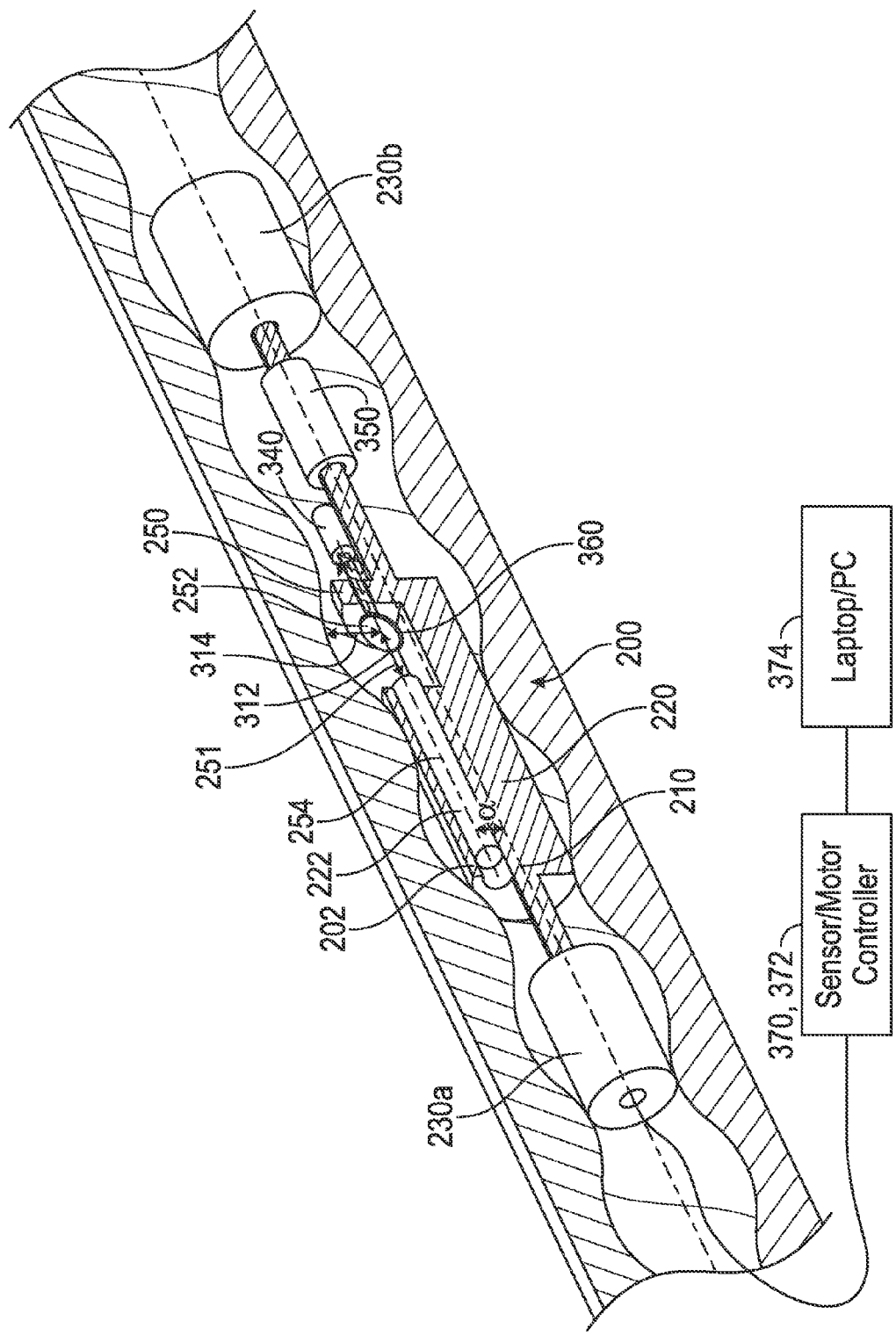
FIG. 3 is a cross-section of the device shown in FIG. 2 along with a control unit for operating the device of FIG. 2 and a computer-based unit for determining the inner profile of a device, according to one embodiment of the disclosure.

FIG. 3 is a longitudinal cross-section of the device 200 shown in FIG. 2 along with a control unit 370 for operating the sensor 222 and deflection device 252. The device 200 includes a drive 350, such as a motor, that rotates the housing 202 between the clamps 230a and 230b about the device center axis 210 at a selected rotational speed. The deflection section 250 includes a deflection device drive 340 configured to rotate the deflection device 252 about a fixed location 360 on the sensor axis 254 at a selected rotational speed. In operation, the sensor 222 directs a light beam 312 on to the deflection device 252 along the light beam axis 251. The light beam 312 reflects off the deflection device 252 and is directed toward the inside of the member in which the device 200 is clamped by the clamps 230a and 230b. The offset between the center axis 210 of the device 200 and the light beam axis 251 is shown as "a." In one configuration, the sensor 222 may be a confocal chromatic sensor. Such sensors are known in the art and are thus not described in detail herein. Any available confocal chromatic sensor may be utilized for the purpose of this disclosure. The control unit 370, in one aspect, may include a sensor/motor controller or control unit 372 and a computer or processor 374 for controlling the operation of the controller 372. To determine the inner profile of a member, such as a stator with internal lobes, the device 200 is placed inside the stator and clamped therein by the clamps 230a and 230b. The sensor/motor controller 372, operated by the computer 374, causes the sensor 222 to direct the light beam 312 onto the deflection device 252 while the defection device 252 is rotating about the light beam axis 251 and the housing 202 is being rotated about center axis 210. In aspects, the controller 372 independently controls the rotational speeds of drives 340 and 350 in response to commands from the computer 374. The light beam 314 reflected from the inside of the stator is received by the sensor 222. The axis 254 of the reflected light beam 314 is the same axis the emitted light beam axis 251.

Figure 4:
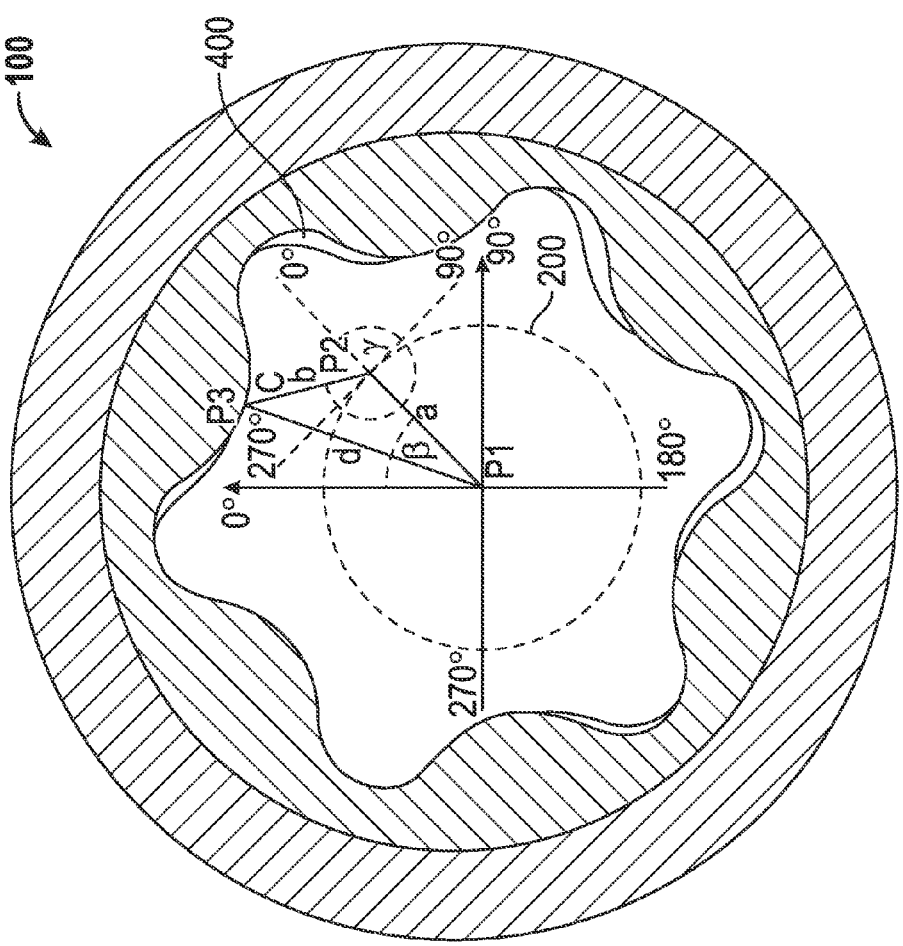
FIG. 4 shows the relationship of various distances relative to a rotating light beam from the deflection device shown in FIG. 3 to the interior contoured of an exemplary stator, such as the stator shown in FIGS. 1A and 1B.
Figure 5:
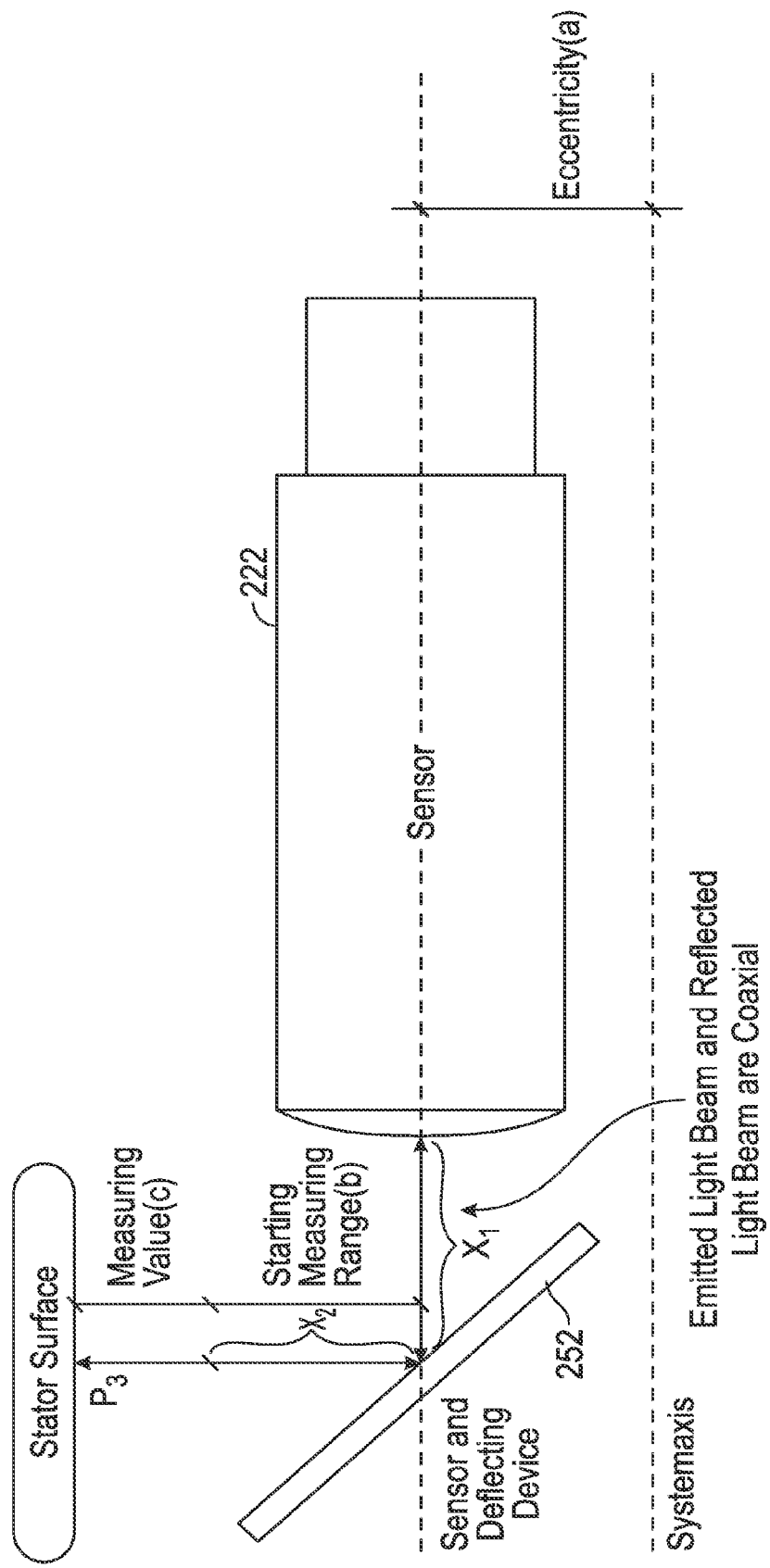
FIG. 5 is schematic drawings showing coaxial emitted and reflected light beams corresponding to the embodiment of the device shown in FIG. 3.

FIG. 4 is schematic drawing showing a geometric relation among rotations of the deflection device and the device 200, the transmitted and reflected light beams and offset of the deflection device 250 (FIG. 2). Line 400 defines the inner contour of the stator 100. Point P1 represents the location of the center axis 210; distance "a" represents the offset or "eccentricity" between the center axis 210 and the sensor or emitted and reflected optical beam axis 251 and 254, as described in reference to FIG. 2. Distance "b" represents the starting measuring range of the optical beam, as described in more detail in reference to FIG. 5. "P2" is the location of the center of the deflection device spaced a distance "a" (offset) from P1. The deflection device rotates about P2, while both the device 200 and the deflection device rotate about P1. Distance "c" represents the actual known measuring distance. Beta is the known system rotation angle, while Gamma is the known rotation angle of the deflection device angle, as shown in FIG. 5. In one embodiment, gamma is 45 degrees.

FIG. 5 shows a schematic diagram of the path of a light beam 510 from the sensor 222 to the inside surface of the stator 112. The light beam 510 from the sensor 222 travels a distance x1 and strikes the deflection device 252. The light beam deflects from the deflection device 252 and travels a distance x2 plus distance c and strikes the inside 112 of the stator at a location P3. The light from location P3 reflects back to the deflection device 252 and is fed to the sensor/motor controller 370 (FIG. 3) for processing the received signals. As shown in FIGS. 4 and 5, a is the offset, b is the starting measuring distance and is the sum of X1 and X2 (b=X1+X2), 13 is the angle between the vertical line and the zero vector of the deflection device, and γ is the angle between the deflection device zero vector and location P3. The distance d is the unknown to be determined by the system.

To determine the inside profile of a device, the device 200 is clamped inside such device. Both the deflection device and the sensor assembly are rotated about their respective axes. A light beam is passed from a sensor, such as a confocal chromatic sensor, to the rotating deflection device, such as a mirror, having a known offset from the axis of the sensor assembly. The light beam reflects off the deflection device and impinges on the inside surface of the device. A computer processes the light beams reflected from the inner surface of the device and determines the distance from the center of the deflection device or another suitable location to the inside surface of the device. Since the deflection device is rotating about its own axis and also about the axis of the measuring device, the light beam scans the entire inside profile of the device and the signals received from the inner profile are processed by the controller/computer combination to provide the entire inside profile of the device. The profile may be produced in a two-dimensional or three-dimensional form. To obtain the profile at another inside location of the measured device, the device 200 is moved to that location, clamped inside the measured device and the process described above is repeated.

As shown in FIGS. 2-5, the elements of the device 200 include: a measuring device with coaxial optical paths for the emitted and reflected light beams; a rotating deflection device to direct the emitted light beam to the inner surface of the measured device and to direct the reflected light from the inner surface to the measuring device; a drive to rotate the deflection device; a drive to rotate the measuring device and the deflection device about the central axis of the device 200; a controller to control the light beam and the rotations of the deflection device and the measuring device; and a computer or processor for processing the reflected light beam signals to determine the inner profile of measured device. The device 200 utilizes coaxial optical paths for the emitted and reflected light beams and the computer utilizes determines the inner profile of the measured device from the geometrical relationships of the light beams, the deflection device and the inner profile of the measured device.

In aspects, the measuring device may have a limited measuring range. The eccentricity "a" moves the measuring range of the light beam to the nearest position of the inner profile of the measured device. The deflection device deflects the emitted light to the inner profile and deflects the reflected light to the measuring device. The combination of the rotating deflection device and the measuring device with the offset from the central axis causes the following effects: (a) the angle between the light beam and the inner profile surface of high-angle flanks or back taper is reduced, which increases the amount and accuracy of the measurement data; (b) the superposed rotation of the measuring device and the deflection device can reduce the time required for a measurement; and (c) multiple surface point measurements with different light beams—surface angles—may be made to increase the stability of the measurement and thus the quality of the measurement data. Such a measuring system can be adapted to different inner profiles without compromising cycle time, quality and accuracy of the measurement data.

As discussed before in reference to FIGS. 2 and 3, the central axis of the housing (enclosing the measuring device, deflection device and the drives) and the central axis of the measured are coaxial when the housing is clamped inside the measured device being measured. Alternatively, the device 200 may be configured to move linearly inside the measured device and simultaneously rotate about the central axis. In such a configuration, linear motion provides line profile measurement while rotational motion provides ring profile measurement. Therefore, by using both linear and rotational motions simultaneously, the device 200 can generate a three dimensional profile of the inner surface of a device.

Thus, in aspects, the apparatus 200 is a mobile Inner contour measurement apparatus or system that measures cross-section of a hollow device, such as a stator. The apparatus 200, in one aspect, includes a measuring device that contains a sensor, such as a confocal chromatic sensor. The reflected light beam from the measured device is coaxial to the emitted light from the sensor. This effect is used to deflect the light (emitted and reflected) with deflection device to inner surface of the measured device. To obtain a high amount of direct reflected light the system 200 utilizes: (1) a sensor and deflection device that are positioned eccentric to the center axis of the measured device, wherein the emitted and reflected light beams are coaxial to each other; (2) a drive to rotate the deflection in front of the sensor; and (3) a rotating system that rotates the deflection device around the inside the measured device. The result is a superposed rotation of the deflection device and the measuring system 200. Such a system provides an accurate measurement angle between the emitted light beam of the sensor and the stator inner surface. This system measures the distances of the flanks of the inside of the measured device, such as the lobes of a stator and provides distances to each location in the flanks of the lobes (i.e., a complete inside profile")

Figure 6:
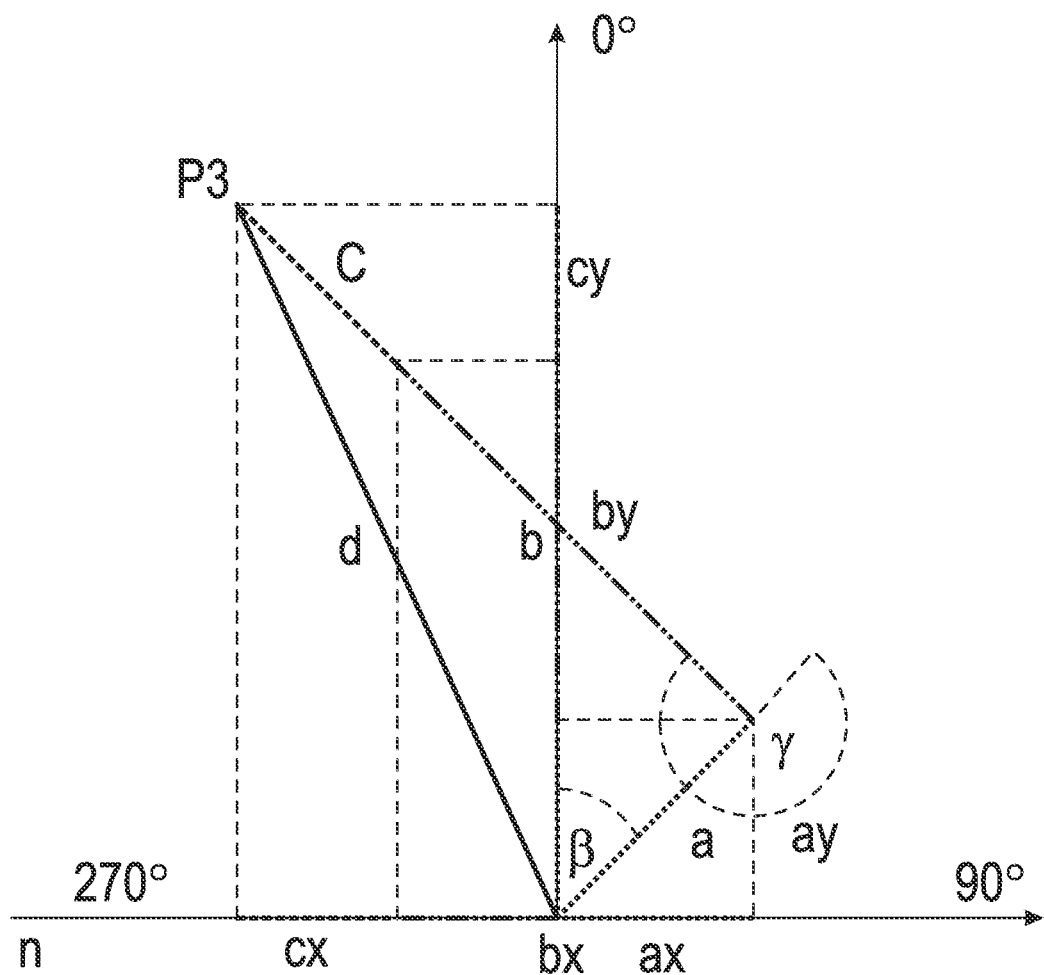
FIG. 6 shows linear and rotational relationship of a rotating emitted light and a reflected light beam from an inner surface of a stator, such as the stator shown in FIG. 3.

FIG. 6 shows linear and rotational relationship of the rotating emitted and reflected light beams used in the device 200 of FIG. 3. A method of determining the distance "d" from the relationships shown in FIG. 6 may be as follows. As discussed before, eccentricity "a is a fixed known value. The starting measuring range "b" also is a fixed and known value. Measuring value c" is the actual known measuring value. Beta is fixed and known Gamma is the known deflectinon device rotation angle. The resulting vector 'd" may be computed as: The x and y components of the eccentricity a may be obtained from the follwing relation.

$$a_x = \sin\beta * a$$

$$a_y = \cos/\beta * a$$

The x and y components of the starting measuring range b may be calculated as:

$$b_x = \sin(\beta+\gamma) * b$$

$$b_y = \cos(\beta+\gamma) * b$$

The x and y components of the measuring value c may be obtained as:

$$c_x = \sin(\beta+\gamma) * c$$

$$c_y = \cos(\beta+\gamma) * c$$

The resulting components of d (e.g., coordinates of P3) may be calculated as:

$$d_x = a_x \pm b_x \pm c_x$$

$$d_y = a_y \pm b_y \pm c_y$$

An example of the computed distance d may be as follows: If a=6 mm; b=13 mm; c=12 mm; Beta=30 degrees; Gamma=290 degrees; ax/ay=3 mm/5.19 mm; bx/by=8.35 mm/9.96 mm; cx/cy=−7.71 mm/9.19 mm, then dx/dy=13.06 mm/25.06 mm.

While the foregoing disclosure is directed to the certain exemplary embodiments of the disclosure, various modifications will be apparent to those skilled in the art. It is intended that all variations within the scope and spirit of the appended claims be embraced by the foregoing disclosure.

The invention claimed is:

1. An apparatus for determining an internal profile of a member, comprising:
   a housing having a first axis central to the housing;
   a measuring device configured to emit a light beam along a second axis offset from the first axis by distance "a";
   a deflection device located along the second axis and rotating about the second axis, the deflection device configured to direct the emitted light beam from the second axis to an inner surface of the member and to direct a light beam reflected from the inner surface of the member along the second axis to the measurement device to determine the internal profile of the member; and
   a driver configured to rotate the measuring device about the first axis.

2. The apparatus of claim 1 further comprising a sensor in the measuring device configured to direct the emitted light beam along the second axis on to the deflection device.

3. The apparatus of claim 2, wherein the sensor is further configured to receive the light beam reflected from the inner surface of the member via the deflection device.

4. The apparatus of claim 1 further comprising a controller configured to control rotation of the deflection device.

5. The apparatus of claim 4, wherein the controller is further configured to control rotation of the measuring device independent of the rotation of the deflection device.

6. The apparatus of claim 1 further comprising a device to rotate the deflection device about a location on the first axis.

7. The apparatus of claim 1 further comprising a processor configured to process light beams reflected from the inner surface of the member to provide one of: (i) a two-dimensional inner profile of the inner surface of the member; and (ii) a three-dimensional inner profile of the inner surface of the member.

8. The apparatus of claim 3, wherein the emitted light beam and reflected light beam are coaxial.

9. The apparatus of claim 1 further comprising clamping devices configured to engage the apparatus to an inner surface of the member in a manner that enables the driver to rotate the measuring device about the first axis.

10. A method for determining a profile of an inner surface of a measured device having a center axis, the method comprising:
    directing a light beam along a light beam axis offset from the center axis onto a deflection device located on the light beam axis and rotating about the light beam axis;
    deflecting the light beam at the rotating deflection device from the light beam axis onto the inner surface of the measured device;

receiving light reflected from the inner surface of the measured device responsive to the light beam directed to the inner surface of the measured device; and determining the profile of the inner surface of the measured device from the reflected light received from the inner surface of the measured device.

11. The method of claim 10 further comprising moving the deflection device through an angle about the center axis.

12. The method of claim 10, wherein the light beam directed to the inner surface of the measured device and the light beam reflected from the inner surface of the measured device are coaxial.

13. The method of claim 11, wherein the rotation of the deflection device about the light beam axis and the motion of the deflection device through the angle about the center axis are superposed.

14. The method of claim 10 further comprising:
(i) moving the deflection device inside the measured device; and
(ii) processing light beam reflected from the inside surface of the measured device to provide a three dimensional inner profile of the measured device.

15. The method of claim 10 further comprising:
(i) moving the deflection device inside the measured device while rotating the deflection device in two directions; and
(ii) processing light beam reflected from inside of the measured device to provide a three dimensional inner profile of the measured device.

16. The method of claim 10 further comprising securing the deflection device inside the measured device.

17. The method of claim 10, wherein directing the light beam comprises directing the light beam by a sensor placed in the measured device that is configured to be moved in the measured device through an angle about the center axis.

* * * * *